June 19, 1945.   R. T. McGOLDRICK ET AL   2,378,422
COUNTING APPARATUS
Filed July 29, 1942   2 Sheets-Sheet 1
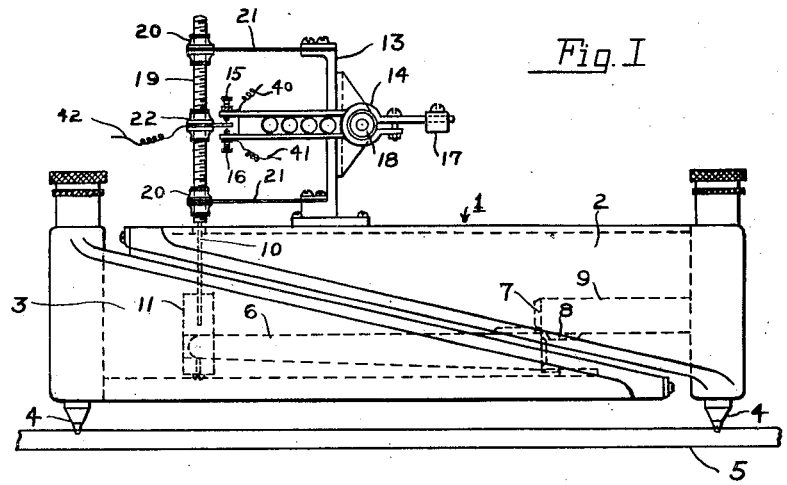
Fig. I
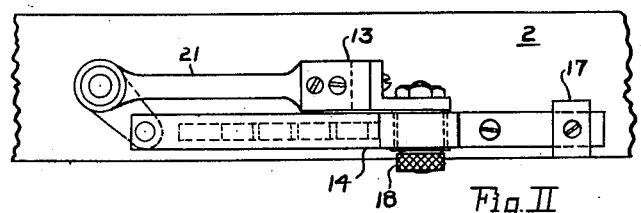
Fig. II
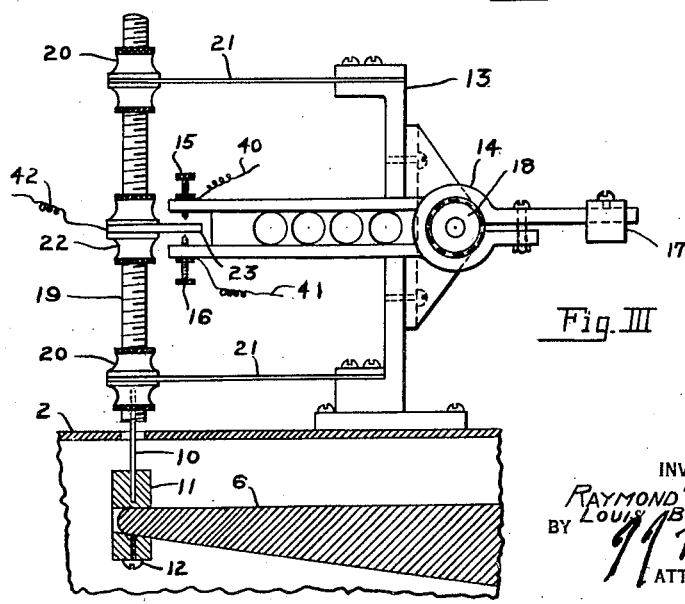
Fig. III
INVENTORS
RAYMOND T. McGOLDRICK.
LOUIS B. TUCKERMAN,
BY
ATTORNEY June 19, 1945.   R. T. McGOLDRICK ET AL   2,378,422
COUNTING APPARATUS
Filed July 29, 1942   2 Sheets-Sheet 2
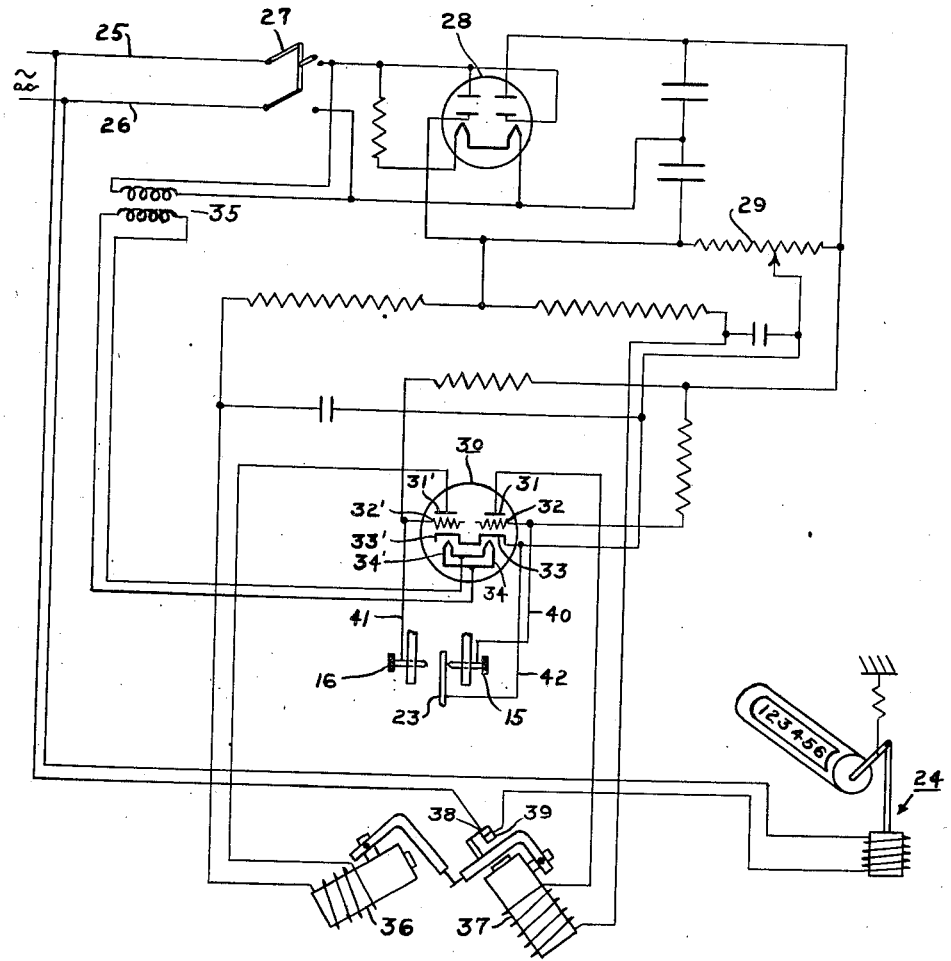
Fig. IV
INVENTOR
RAYMOND T. McGOLDRICK.
BY LOUIS B. TUCKERMAN.
ATTORNEY Patented June 19, 1945

2,378,422

UNITED STATES PATENT OFFICE 2,378,422

COUNTING APPARATUS

Raymond T. McGoldrick and Louis B. Tuckerman, Washington, D. C.

Application July 29, 1942, Serial No. 452,762

3 Claims. (Cl. 235—92)

(Granted under the act of March 3, 1883, as amended April 30, 1928; 370 O. G. 757)

Our invention relates generally to counting apparatus and in particular to apparatus for counting variations in a measured quantity.

While our invention may be utilized with any measuring device having an element movable in accordance with variations in the quantity measured, such as, for example, liquid level gauges, thermometers, dial indicators, pointers, etc., it is particularly useful in connection with strain gauges which measure variations in strain in structural members such as structural members of ships and the like which are subject to a substantially cyclic stress loading and will be described herein with respect to its application to a strain gauge.

For example, if the center of a ship rides upon the crest of a wave, tensile stresses are introduced in the longitudinal structural members in the upper part of the ship and compressional stresses are introduced in the longitudinal structural members in the lower part of the ship. Conversely when the ship has moved with respect to the wave so that the center of the ship is in the trough of a wave, these stresses are reversed.

Knowledge of the frequency of such cycles of variation in stress in the structural members and the nature of the magnitude of such stresses is of distinct value in checking the stress characteristics of structural members of the ship under actual operating conditions against theoretically assumed stresses utilized in designing the ship's structural members. This information is extremely important when it is remembered that the safety of a structural member depends not only upon the maximum steady stress which the member can carry but also upon the frequency and magnitude of variations in the stress set up within the member.

The general object of our invention, is, therefore, to provide a device for counting the number of times which a measure quantity varies between predetermined limits or by a predetermined amount.

Other objects of our invention will become apparent from the detailed description to follow and from the accompanying drawings, in which like reference characters refer to like parts in the various views.

In the drawings:

Fig. I is a side elevation of a preferred embodiment of a device made in accordance with the principles of our invention;

Fig. II is a fragmentary top plan view of the apparatus shown in Fig. III.

Fig. III is an enlarged fragmentary portion, partially in section and partially in elevation, of the apparatus shown in Fig. I; and Fig. IV is a combined schematic and diagrammatic view of the electronic apparatus utilized for obtaining operation of the counting mechanism.

Referring now to the drawings, our improved apparatus comprises a split frame 1 which includes an upper half portion 2 and a lower half portion 3. The frame halves 2 and 3 are so connected as to be movable slidably relative to each other. Conical bearing points 4—4 are provided respectively for the frame halves 2 and 3 and are adapted to be inserted in holes provided in a body member 5 which may be subjected to strain.

As the body member 5 elongates or shortens, the frame halves 2 and 3 will move away from or towards each other, as the case may be. This motion is multiplied by means of a lever 6 which is connected to one of the pair of leaf spring members 7 and 8. Spring members 7 and 8 are arranged perpendicular to each other in a cross and tied together at their intersection. One end of leaf spring 7 is secured to the end face of a support 9 carried by the upper frame half, the other end being secured to the end face of lever 6 and also to frame half 1. One end of leaf spring 8 is secured to the bottom face of support 9 and the other end to the top face of lever 6.

A rod member 10 is secured within a support 11, the latter including an opening therethrough by which it can be slipped over the end of lever 6 and secured in position by means of a screw 12.

Thus it will be seen that as the body member 5 is strained, the magnitude of such strain will be multiplied by movement of the lever 6 which, because of its relatively long length, causes considerable substantially vertical movement of the rod member 10.

An upstanding member 13 is supported on the top face of the upper frame half 2 and provides for pivotally mounting a rocker arm 14. One end of the rocker arm 14 is bifurcated in part to receive a pair of contact screws 15 and 16. The other end of the rocker arm 14 may be provided with a weight 17 which is adjustable thereon and serves as a counterbalance for that portion of the rocker arm 14, which lies on the opposite side of the pivotal support.

Rocker arm 14 is pivotally connected to member 13 by means of a bolt and nut assembly 18 and the frictional characteristics of this pivot assembly are such that rocker arm 14 moves relatively freely about its pivotal support on member 13, but will, at the same time, remain in any position to which it is moved.

As will become apparent from the description following in connection with operation of our device, the frictional pivot support for rocker arm 14 is provided to take care of situations in which the variations in stress are not always between like maximum and minimum limits.

A threaded stud 19 includes threaded nuts 20—20 disposed respectively at opposite ends thereof. The nuts 20—20 are secured respectively to one end of leaf spring 21—21, the other ends of the springs 21—21 being secured to upstanding member 13.

A threaded nut 22 is disposed at a central portion on the stud 19 and carries a third contact member 23.

The lower end of stud 19 is bored axially for receiving one end of the rod member 10. Thus as body member 5 undergoes a stress resulting in a strain or deformation, such deformation will cause contact member 23 to move toward one or the other of contact screws 15 and 16, dependent, of course, upon whether such deformation results from an increase or decrease in a given condition of stress in the body member 5. Since the ratio of strain in the body member 5 to amplitude of movement of contact member 23 is a constant value (this ratio being the multiplication factor of the leverage system), it will be evident that contact screws 15 and 16 may be so adjusted that the distance between them minus the thickness of the contact member 23 can be made proportional to any specific change in magnitude of strain which may take place in the body member 5. It will be evident that any other type of strain gauge having an element movable in proportion to the strains effected in body member 5 can be utilized to move contact member 23 in lieu of the particular type illustrated.

For counting the number of such changes in magnitude of strain, we have provided for incorporating a suitable counting device such as, for example, the counter 24 having electro-responsive actuating means (Fig. IV). This counter is connected for operation by means of an electronic circuit, which is shown schematically in Fig. IV. Operation of this latter circuit is controlled by contacts made between contact member 23 and contact screws 15 and 16.

Referring now to Fig. IV, alternating current power may be supplied from any suitable source to conductors 25 and 26 through a switch 27. When the switch 27 is closed alternating current is fed into an electronic rectifying device 28 which is provided for obtaining a unidirectional voltage drop across a resistor 29.

This voltage drop provides the anode-cathode potential for a double triode space discharge device 30 containing anodes 31—31', grids 32—32', and cathodes 33—33'. The space discharge device 30 in this particular embodiment is illustrated as being the "hot" cathode type, the cathode being heated by means of filaments 34—34' which are supplied by a transformer 35.

As will be evident from Fig. IV, grids 32—32' are normally made negative in potential with respect to cathodes 33—33', under which condition very little current will flow in their respective associated anode-cathode circuits.

Grid 32 is connected to contact screw 15 by means of a flexible conductor 40; grid 32' is connected to contact screw 16 by means of flexible conductor 41; and the cathodes 33—33' are connected to the movable contact member 23 by means of flexible conductor 42. Accordingly, the negative grid bias on grid 32 will be shunted out when contact member 23 moves into engagement with contact screw 15 and the negative grid bias on grid 32' will be similarly shunted out when contact member 23 moves into engagement with contact screw 16.

The tube plate circuit including anode 31 and cathode 33 also contains the energizing winding for a relay 37 and the tube plate circuit including anode 31' and cathode 33' also containing a second relay 36.

As will be seen from the drawings, the respective armature members of relays 36 and 37 are so arranged that when relay 37 is energized and its armature pulled down in the position shown, the armature member of relay 36 (this relay then being in a deenergized position), will be in such a position as to lock in relay 37. In other words, when relay 37 is energized and relay 36 is deenergized, the armature of relay 37 cannot move to an open position to thereby separate a pair of contact members 38 and 39 until relay 36 shall have been energized.

As hereinbefore explained, grid 32 is normally made negative in potential with respect to its associated cathode 33. However, it will be seen that when contact member 23 moves in response to strain in the body member 5 to engage contact screw 15, the negative grid bias on grid 32 will be shunted out. This will permit a relatively large increase in current in the tube circuit including anode 31, cathode 33 and the winding for relay 37, causing the armature member of the latter to move downwardly and close contact members 38 and 39. Upon closure of contact members 38 and 39, a circuit will be completed from conductors 25 and 26 to the electromagnetically operated counter 24. When counter 24 is energized, its armature member will be caused to move downwardly, which action causes the counter mechanism to count once. These counters are so constructed that they cannot count a second time until the operating coil therefor has been deenergized. The counter, however, has only been illustrated diagrammatically in Fig. IV, as its general construction is well known in the art, such as, for example, described in U. S. Patent No. 2,097,151.

As strain in body member 5 decreases, contact member 23 will move out of engagement with contact screw 15, thus removing the shunt between grid 32 and cathode 33 which is then effective to deenergize the winding of relay 37. As heretofore explained, however, due to the interlocking action between the armature members of the relays 36 and 37, the armature of relay 37 will be mechanically locked in its closed position and thus keep contacts 38 and 39 closed to maintain the flow of current in the energizing coil of counter 24.

If strain in the body member 5 should further decrease until contact member 23 engages contact screw 16, the negative grid bias on grid 32' will be shunted out, thus permitting a relatively large increase in current flow in the circuit of tube 30 including anode 31', cathode 33', and the energizing coil of relay 36. This causes the armature member of relay 36 to move downwardly to thereby release the armature member of relay 37 and allow the armature member of relay 37 to move upwardly and break contacts 38 and 39. When contacts 38 and 39 are thus opened, the operating coil for the electromagnetic counter 24 will be deenergized.

Should now the strain in the body member 5 increase to such an extent that contact member 23 reengages contact screw 15, relay 37 will again be energized and cause contacts 38 and 39 to reclose, which will again establish current flow in the operating winding of counter 24 and cause the latter to count a second time.

Thus it will now be evident that by means of our improved apparatus, the counter 24 will be caused to count once upon an initial increase in strain of a predetermined magnitude in the body member 5 but will be prevented from counting a second such increase in strain until the strain in the body member has been reduced to a predetermined magnitude. In other words, when contact member 23 is moved by deformation of the body member 5 into engagement with contact screw 15 to cause the counter 24 to count once, the counter 24 will not count again until the contact member 23 shall have moved to engage contact screw 16 and then reengage contact screw 15. To put it another way, counter 24 thus counts once for each complete excursion of contact member 23 from contact with screw 15 back to contact with screw 16 and then forward again into contact with screw 15.

As previously stated, one object of our invention was to provide an apparatus for counting the number of times which a measured quantity changes by a predetermined amount. For example, when our apparatus is applied to a strain gauge, one might desire to know the number of times which the stress in the body member upon which the gauge was installed varied by 3,000 lbs. per square inch. In such a case the counting apparatus would be initially set up with rocker arm 14 so adjusted that contact member 23 is in engagement with contact screw 16 and the distance between contact screws 15 and 16 minus the thickness of contact member 23 adjusted so as to be equivalent to a variation in stress in the body member 5 of 3,000 lbs. per square inch. Thus when stress in body member 5 increases, contact member 23 will begin to move upwardly. If the increase in stress reaches 3,000 lbs. per square inch, contact member 23 will engage contact screw 15 and cause counter 24 to count once. In the event there should be a further increase in stress in body member 5 before there is a decrease, such further increase will cause rocker arm 14 to move upwardly about its pivotal support and remain in such position due to the frictional characteristics of the pivot means. If the stress in body member 5 now begins to decrease and the overall decrease in stress amounts to 3,000 lbs. per square inch, contact member 23 will reengage contact screw 16 and, as hereinbefore explained, cause the winding of counter 24 to become deenergized and thus place the latter in a position to count a second time if the stress in body member 5 should now increase by an amount equal to or greater than the differential in stress of 3,000 lbs. per square inch.

In the event that it is desired to know the number of variations in stress between predetermined limits, the spacing between contact screws 15 and 16 can, of course, be set to be equivalent to any selected maximum or minimum value of stress, the rocker arm 14 made substantially free of friction and any suitable yieldable means such as a spring (not shown) interposed between rocker arm 14 and support 13 to bias arm 14 to an initial rest position from which it is movable. Thus, for example, the screws 15 and 16 and the rest position of rocker arm 14 might be so adjusted that contact member 23 moves into engagement with contact screw 16 when stress in the body member 5 falls to 5,000 lbs. per square inch and moves into engagement with contact screw 15 when stress in body member 5 rises to 8,000 lbs. per square inch. With this arrangement, the counter 24 would register once for each time contact member 23 made contact successively with contact screws 15 and 16 and one would then know the number of times the stress in body member 5 changed from 5,000 lbs. per square inch, or less to 8,000 lbs. per square inch, or more.

In the foregoing description, we have explained how a single one of our counting devices may be utilized to obtain the number of times that stress in a body member changes by a given amount or the number of times that such stress changes within predetermined limits. It will be evident that a plurality of such devices, each calibrated for response to a different bracket of stress values may be utilized on the same body member to obtain a more complete picture of the stress characteristics in the body member.

In conclusion, it will be evident that many changes and modifications in the particular embodiment of our invention, which has been described, may occur to those skilled in the art without departing from the spirit and scope of our invention.

We also desire it to be understood that our counting apparatus may be utilized with other types of quantity measuring devices and that the appended claims are to be so construed.

The invention described herein may be manufactured and used by or for the Government of the United States of America for governmental purposes without the payment of any royalties thereon or therefor.

We claim:

1. In a measuring system, the combination comprising, a quantity measuring device, said device including a measuring element, a support on said device, an arm movably mounted on said support, means for maintaining said arm in any position to which it may be moved, a pair of spaced contact members, a third contact member disposed intermediate said spaced contact members, said contact members being so supported by said measuring element and arm that said third contact member and said spaced contact members move relative to each other as a function of the quantity measured by said measuring element, and means including electro-responsive counter means controlled through said contact members for counting the number of complete excursions of said third contact member between said spaced pair of contact members.

2. The combination in claim 1 wherein said spaced contact members and said third contact member are adjustable relative to each other.

3. In a measuring system, the combination comprising, a quantity measuring device, said device including a measuring element, a support on said device, an arm movably mounted on said support, means for maintaining said arm in any position to which it may be moved, a pair of spaced contact members carried by said arm, a third contact member, means for supporting said third contact member by said measuring element for motion between said spaced pair of contact members as a function of the quantity measured, and means including electro-responsive counter means controlled through said contact members for counting the number of complete excursions of said third contact member between said spaced pair of contact members.

RAYMOND T. McGOLDRICK.
LOUIS B. TUCKERMAN.